US008681589B2

(12) United States Patent
Baeten

(10) Patent No.: US 8,681,589 B2
(45) Date of Patent: Mar. 25, 2014

(54) METHOD AND SYSTEM FOR PERFORMING SEISMIC SURVEYS WITH A LOW FREQUENCY SWEEP

(75) Inventor: Guido Jozef Maria Baeten, Rijswijk (NL)

(73) Assignee: Shell Oil Company, Houston, TX (US)

( * ) Notice: Subject to any disclaimer, the term of this patent is extended or adjusted under 35 U.S.C. 154(b) by 377 days.

(21) Appl. No.: 13/122,079

(22) PCT Filed: Oct. 2, 2009

(86) PCT No.: PCT/EP2009/062802
§ 371 (c)(1),
(2), (4) Date: Apr. 28, 2011

(87) PCT Pub. No.: WO2010/037840
PCT Pub. Date: Apr. 8, 2010

(65) Prior Publication Data
US 2011/0205842 A1    Aug. 25, 2011

(30) Foreign Application Priority Data
Oct. 3, 2008   (EP) ..................................... 08165827

(51) Int. Cl.
*G01V 1/155*    (2006.01)
*G01V 1/00*     (2006.01)
(52) U.S. Cl.
USPC ............................... 367/189; 367/36; 367/37
(58) Field of Classification Search
USPC .............................................. 367/36, 37, 189
See application file for complete search history.

(56) References Cited

U.S. PATENT DOCUMENTS

| 2004/0089499 | A1  | 5/2004 | Smith ........................... 181/110 |
| 2006/0018192 | A1  | 1/2006 | Jeffryes et al. ................... 367/41 |
| 2007/0133354 | A1  | 6/2007 | Bagaini et al. ................. 367/189 |
| 2007/0195644 | A1* | 8/2007 | Marples et al. ................. 367/39 |

FOREIGN PATENT DOCUMENTS

| GB | 2387226       | 10/2003 | ............... G01V 1/02 |
| WO | WO 2007068891 | 6/2007  | ............... G01V 1/00 |

OTHER PUBLICATIONS

Wei, Z. et al.; "Pushing the Vibrator Envelope—How Low Can We Go?"; EAGE 69$^{th}$ Conference & Exhibition; London, UK; Jun. 11-14, 2007; p. 183.
Wei, Z.; "Pushing the Vibrator Envelope—How Low Can We Go?"; EAGE 69$^{th}$ Conference & Exhibition; London, UK; Jun. 11-14, 2007; p. 184.
Bagaini, C; "Low Frequency Vibroseis Data with Maximum Displacement Sweep"; Society of Exploration Geophysics; Tulsa, OK; vol. 27, No. 5; May 1, 2008; pp. 582-584, 5, XP001512169, ISSN: 1070-458X.

* cited by examiner

*Primary Examiner* — Isam Alsomiri
*Assistant Examiner* — Hovhannes Baghdasaryan

(57) ABSTRACT

A method and system are disclosed for performing seismic surveys using a seismic vibrator, which generates a sweep signal with enhanced low frequency content by generating a combination of a linear and nonlinear sweep and wherein the nonlinear sweep $s_{nonl}(t)$ as a function of time (t) is calculated by a predetermined algorithm.

7 Claims, 1 Drawing Sheet

METHOD AND SYSTEM FOR PERFORMING SEISMIC SURVEYS WITH A LOW FREQUENCY SWEEP

PRIORITY CLAIM

The present application claims priority from PCT/EP2009/062802, filed 2 Oct. 2009, which claims priority from European Application EP 08165827.0, filed 3 Oct. 2008.

TECHNICAL FIELD OF THE INVENTION

The invention relates to a method and system for performing seismic surveys using a seismic vibrator, which generates a sweep signal with enhanced low frequency content.

BACKGROUND OF THE INVENTION

Such a method and system are known from US patent application US 2007/0133354, International patent applications WO2007068891 and WO2007068891 and from the paper "Pushing the Vibrator Envelope—How Low Can We Go" presented by Z. Wei et al at the EAGE 69$^{th}$ Conference & Exhibition held in London, UK from 14 to 17 Jun. 2007.

In this paper the following conclusions are drawn.

The reaction mass peak-to-peak stroke and the peak-decoupling force are two key factors that limit the energy that can be transmitted into the earth by a P-wave vibrator. The reaction mass peak-to-peak stroke is more dominant at very low frequencies. As frequency is increased the peak-decoupling force limits the vibrator output. The boundary frequency between these two factors falls between 4 and 5 Hz depending on the weight of the reaction mass. The heavier the reaction mass, the lower the boundary energy becomes. A heavier mass helps the vibrator produce more fundamental force energy and reach the target force quickly.

The paper "Low Frequency vibroseis data with maximum displacement sweep" published by C. Bagain in the Leading Edge, Society of exploration geophysics, Tulsa, Okla., US, Vol 27, No. 5, 1 May 2008, pages 582-584, 586, 5, XP001512169, ISSN:1070-458X describes a maximum displacement (MD) sweep, which uses measurements to specify the seismic vibrator behaviour at low frequencies (typically 1-6 Hz). Subsequently, in the known method a sweep function is developed that is required to generate a flat output spectrum; typically, this sweep function is the inverse of the measured response.

Other Maximum Displacement (MD) sweep methods which use measurements to specify the seismic vibrator behaviour at low frequencies are known from US patent applications US2006/018192 and 2007/133354 and UK patent 2387226.

It is an objective of the present invention to provide a method and system, which generate an enhanced low frequency content in a seismic signal in a more efficient and accurate manner than the prior art methods and systems, and which obviate the time consuming and expensive requirement to use measurements to specify the seismic vibrator behavior at low frequencies associated with the known Maximum Displacement (MD) sweep methods.

SUMMARY OF THE INVENTION

In accordance with the invention there is provided a method for performing seismic surveys using a seismic vibrator, which generates a sweep signal with enhanced low frequency content by generating a combination of a linear and nonlinear sweep, wherein the nonlinear sweep $S_{nonl}(t)$ as a function of time (t) is calculated by a predetermined algorithm.

It is observed that the finite piston stroke of a seismic vibrator yields a lower limit for the frequency where maximum force can be exerted upon the earth. This frequency is normally referred to as the displacement limit $f_{disp}$. Below $f_{disp}$, force decreases proportional to frequency squared.

The nonlinear sweep may have a duration $T_{nonl}$ and frequency limits from $f_0$ to $f_{disp}$ and the linear sweep may have a duration $T_{lin}$, and frequency limits from $f_{disp}$ to $f_{max}$, wherein the sweep has a duration $T=T_{lin}+T_{nonl}$. Optionally the sweep duration T is between 8 and 12 seconds, the nonlinear sweep duration $T_{nonl}$ is between 2 and 4 seconds and the linear sweep duration is between 6 and 8 seconds.

Preferably, the ratio between the duration of the linear sweep $T_{lin}$ and the non linear sweep $T_{nonl}$ is calculated by the formula:

$$\frac{T_{lin}}{T_{nonl}} = \frac{(n+1)(f_{max} - f_{disp})}{f_{disp}^4 [f_0^{n+1} - f_{disp}^{n+1}]} \times f^{n+4}$$

In this equation, n is a suitably chosen constant with a value between −2 and −6. In practice, the value of n will be chosen close to −4.

In accordance with the invention there is further provided a system for performing seismic surveys, the system comprising a seismic vibrator, which is configured to generate a sweep signal with enhanced low frequency content by generating a combination of a linear and nonlinear sweep, and seismic data interpretation means comprising a predetermined algorithm for calculating the nonlinear sweep $s_{nonl}(t)$ as a function of time (t).

Thus the method and system according to the invention do not require any measurements, but instead assume that the seismic vibrator output at the low frequencies is fully specified by the mechanical parameters of the vibrators (in particular, the piston stroke and reaction mass weight). Hence, an analytic formulae is used to describe the vibrator output limitations at the low frequency. Specifically, the output is assumed to decay as 1/frequency$^2$ for frequencies below $f_{disp}$. As a result of this approach, an analytic expression is obtained for the vibrator sweep that is required to obtain a flat output spectrum.

Preferably, the nonlinear sweep as a function of time is given by $$s_{nonl}(t) = a_{max} \frac{\left[(f_{disp}^{n+1} - f_0^{n+1})\frac{t}{T_{nonl}} + f_0^{n+1}\right]^{\frac{2}{n+1}}}{f_{disp}^2} \times$$

$$\sin\left(2\pi \frac{T_{nonl}\left((f_{disp}^{n+1} - f_0^{n+1})\frac{t}{T_{nonl}} + f_0^{n+1}\right)^{\frac{1}{n+1}+1}}{(f_{disp}^{n+1} - f_0^{n+1})\left(\frac{1}{n+1}+1\right)}\right) \quad 0 \le t \le T_{nonl},$$

wherein:
$a_{max}$ is the maximum amplitude of the vibrator,
f is frequency,
$T_{nonl}$ the duration of the nonlinear part of the sweep, and the exponent n has a value preferably selected between −4 to 4.

The expressions for $s_{nonl}$ and $s_{lin}$ need to be combined to form one output signal that delivers a flat output spectrum from, typically, 1 to 80 Hz. This requires computation of the sweep time $T_{nonl}$, which can also be done analytically in the method and system according to the invention.

The method and system according to the invention do not require measurements, but instead the sweep is developed using a predetermined algorithm comprising analytic expressions for the sweep components.

These and other features, embodiments and advantages of the method and/or system according to the invention are described in the accompanying claims, abstract and the following detailed description of preferred embodiments disclosed in the accompanying drawings in which reference numerals are used which refer to corresponding reference numerals that are shown in the drawings.

DETAILED DESCRIPTION OF THE DEPICTED EMBODIMENTS

Figure 1:
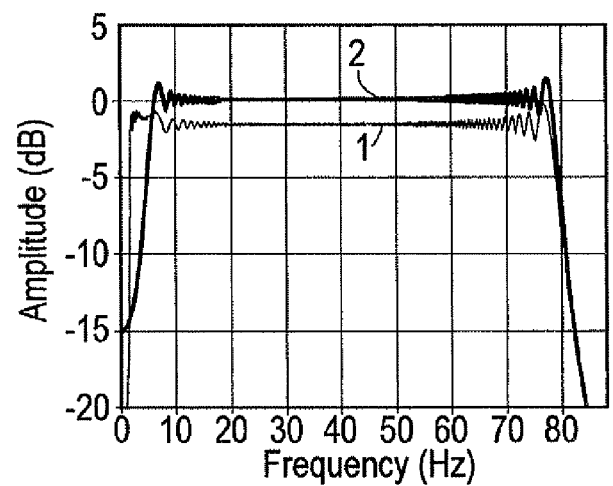
FIG. 1 shows spectra for the conventional (black) and broadband (grey) sweep generated by the method and system according to the invention. Both sweeps have a duration of 10 s. The force limitation at the low frequencies, caused by the finite piston stroke, is fully accounted for in this plot.

In accordance with the invention a seismic signal with a low-frequency sweep is generated in the following manner.

The behaviour of a seismic vibrator towards lower frequencies is governed by the displacement limit $f_{disp}$, the frequency where the finite piston stroke of the seismic vibrator can just sustain peak force. This displacement limit is, for most vibrators, in the order of 5-7 Hz. Below the displacement limit $f_{disp}$, force decays with $f^2$. This assumes a stationary baseplate (so that ground force and driving force can be assumed equal).

In accordance with the invention a sweep is designed that generates a flat amplitude spectrum over the entire bandwidth. Define the following frequencies:

Lower sweep frequency $f_0$. Typically, for low-frequency applications $f_0$ will be in the order of 1-3 Hz. Note that for conventional seismic acquisition, $f_0$ typically is in the order of 6-10 Hz.

Displacement limit $f_{disp}$. This frequency is determined by the design of the hydraulic vibrator. In particular, the displacement limit follows from the piston stroke and the mass of the so-called reaction mass. Typical values for $f_{disp}$ are 5-7 Hz.

Upper sweep frequency $f_{max}$. Typically, the upper sweep frequency is in the order of 70-80 Hz.

For the generation of low frequencies, a combination of a linear and a nonlinear sweep is generated in accordance with the invention, with frequency limits ranging from $f_0$ to $f_{disp}$ for the nonlinear sweep, and $f_{disp}$ to $f_{max}$ for the linear sweep. The nonlinear part of the sweep has a duration $T_{nonl}$, whereas the linear part of the sweep has a duration $T_{lin}$. The total duration of the sweep is denoted as T; hence, $$T_{nonl} + T_{lin} = T$$

The total sweep s(t) is written as $$s(t) = \begin{cases} s_{nonl}(t), & 0 \le t \le T_{nonl} \\ s_{lin}(t), & T_{nonl} \le t \le T \end{cases}$$

Before addressing the expressions for s(t), we first recall some basic equations referring to the theory of sweeps. In general, a sweep can be described by the equation $$s(t) = a(t)\sin(2\pi\theta(t))$$

where a(t) denotes an amplitude modulation term and $\theta$ denotes the phase.

The instantaneous frequency f is obtained as $$f^{inst}(t) = f = \theta'(t)$$

and the sweep rate is defined as $$sr(t) = \frac{df}{dt}$$

The nonlinear sweep is generated in accordance with the invention in the following manner.

The nonlinear sweep is given by $$s_{nonl}(t) = a(t)\sin(2\pi\theta_{nonl}(t)), \ 0 \le t \le T_{nonl}$$

with $$\theta_{nonl} = \frac{T_{nonl}\left((f_{disp}^{n+1} - f_0^{n+1})\frac{t}{T_{nonl}} + f_0^{n+1}\right)^{\frac{1}{n+1}+1}}{(f_{disp}^{n+1} - f_0^{n+1})\left(\frac{1}{n+1}+1\right)} + \theta_0$$

$$(n \ne -2) \quad 0 \le t \le T_{nonl}$$

where $\theta_0$ is a suitably chosen initial phase function.

This initial phase function can be determined such that a sequence of sweeps with varying initial phases lead to a reduction in the harmonic energy of the combined output.

This technique is well-known in the field of sweep design.

From a theoretical point of view, exact compensation of the output decay towards the lower frequencies (order $f^2$) is achieved by choosing a value of −4 for the exponent n in the equation above. In practice, values close to −4 may be preferred as they can give a better spectral continuity. In general, a value for the exponent n of −4 to 4, preferably from −3.5 to 4, is suggested. In the range $f_0$-$f_{disp}$, the amplitude a(t) of the sweep (relative to the maximum amplitude of the vibrator, $a_{max}$) is proportional to the instantaneous frequency squared:

$$a(t) = a_{max}\frac{f^2}{f_{disp}^2}$$

This amplitude behaviour is dictated by the finite piston stroke of the hydraulic vibrator. The instantaneous frequency f is given by $$f = \left[(f_{disp}^{n+1} - f_0^{n+1})\frac{t}{T_{nonl}} + f_0^{n+1}\right]^{\frac{1}{n+1}}$$

and the sweep rate follows from $$sr = \frac{f_{disp}^{n+1} - f_0^{n+1}}{(n+1)T_{nonl}} f^{-n}$$

Hence, the nonlinear sweep as a function of time is given by $$s_{nonl}(t) = a_{max} \frac{\left[(f_{disp}^{n+1} - f_0^{n+1})\frac{t}{T_{nonl}} + f_0^{n+1}\right]^{\frac{2}{n+1}}}{f_{disp}^2} \times$$

$$\sin\left(2\pi \frac{T_{nonl}\left((f_{disp}^{n+1} - f_0^{n+1})\frac{t}{T_{nonl}} + f_0^{n+1}\right)^{\frac{1}{n+1}+1}}{(f_{disp}^{n+1} - f_0^{n+1})\left(\frac{1}{n+1} + 1\right)}\right) \quad 0 \le t \le T_{nonl}$$

The linear sweep is generated in the method and system according to the present invention in the following manner.

The corresponding equations for the linear sweep $s_{lin}(t)$ are well-known and given by $$s_{lin}(t) = a_{max} \sin(2\pi \theta_{lin}(t)), \quad T_{nonl} \le t \le T$$

$$\theta_{lin} = \left[f_{disp} + \frac{1}{2}\frac{f_{max} - f_{disp}}{T_{lin}}(t - T_{nonl})\right](t - T_{nonl}), \quad T_{nonl} \le t \le T$$

$$f = f_{disp} + \frac{f_{max} - f_{disp}}{T_{lin}}(t - T_{nonl}), \quad T_{nonl} \le t \le T$$

$$sr = \frac{f_{max} - f_{disp}}{T_{lin}}, \quad T_{nonl} \le t \le T$$

The method and system according to the invention generate a total sweep time T in the following manner.

The ground force spectrum is proportional to the inverse of the square root of the sweep rate.

For a nonlinear sweep of duration T, exponent n, and Begin—and end frequencies $f_0$ and $f_1$, the spectrum can be approximated as:

$$|F_G| \cong \left(\frac{(n+1)T}{f_1^{n+1} - f_0^{n+1}}\right)^{1/2} f^{n/2}$$

The ground force spectra of the two individual sweep components are given by $$|F_{nonl}| \cong \left(\frac{(n+1)T_{nonl}}{f_{disp}^{n+1} - f_0^{n+1}}\right)^{1/2} f^{n/2} \times \frac{f^2}{f_{disp}^2}$$

for the nonlinear sweep, and $$|F_{lin}| \cong \left(\frac{T_{lin}}{f_{max} - f_{disp}}\right)^{1/2}$$

The total sweep time is equal to T, and given by $$T = T_{lin} + T_{nonl}$$

For the broadband sweep, we require that the ground force spectrum is uniform from $f_0$ up to $f_{max}$. Hence, $$|F_{nonl}| = |F_{lin}|$$

and thus $$\left(\frac{(n+1)T_{nonl}}{f_{disp}^{n+1} - f_0^{n+1}}\right)^{1/2} f^{n/2} \times \frac{f^2}{f_{disp}^2} = \left(\frac{T_{lin}}{f_{max} - f_{disp}}\right)^{1/2}$$

This equation allows computation of the sweep times for the linear and nonlinear part of the sweep s(t). For example, for n=−4, the equation above yields the following expression for the sweep time ratio:

$$\frac{T_{lin}}{T_{nonl}} = \frac{3(f_{max} - f_{disp})}{f_{disp}^4 [f_0^{-3} - f_{disp}^{-3}]}$$

Using the relation $$T = T_{lin} + T_{nonl}$$

the lengths of the individual sweep segments can be calculated.

Once estimates for the sweep times have been obtained, these estimates need to be fine-tuned. The reason for the fine-tuning step is related to the displacement of the reaction mass. The sweep function, integrated twice, represents the displacement of the reaction mass (for low frequencies). To guarantee stability of the reaction mass motion, this displacement function must be a (fluctuating) function close to zero. In general, however, the displacement will contain a trend that must be removed. Removal of this trend can be achieved in the following way:

1. Increase the nonlinear sweep time $T_{nonl}$ by an amount of $\Delta t$ (and, at the same time, decrease the linear sweep time $T_{lin}$ by the same amount, thus keeping the total sweep time constant), where $\Delta t$ is in the order of magnitude of 1 ms
2. Calculate the resulting displacement trend
3. If the trend is not sufficiently close to zero, return to step 1.

It will be understood that:

In the foregoing description, the nonlinear and linear frequency ranges were assumed to be non-overlapping. One can, however, also use an overlap in frequency range, which facilitates the use of taper functions in the transition area to obtain a smooth transition from nonlinear to linear sweep.

The nonlinear sweep need not necessarily terminate at the displacement limit. Although the displacement limit represents a natural choice for the upper limit of the nonlinear sweep, other frequencies may be selected, depending on the objective of the survey.

The amplitude $a_{max}$ represents the maximum force that can be produced by the vibrator in a typical frequency range (10-70 Hz). However, this amplitude can be reduced to account for imperfections in the vibrator system at the low frequencies (such as resonances of the hydraulic system).

The calculations for the sweep time as presented above assume that the desired output is a flat spectrum. One can, however, also impose different conditions (for example, a spectrum that decays towards the lower frequencies), leading to similar equations for the sweep time.

It is also possible to impose constraints on the spectrum at the low frequencies by proper choice of the exponent n in the nonlinear sweep definition. The latter option, however, does assume that the decay can be expressed as a fixed number of dB's per octave.

EXAMPLE

Figure 2:
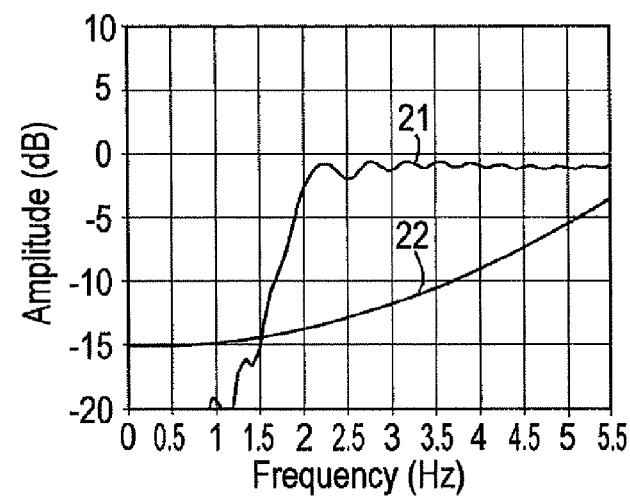
FIG. 2 is a plot which zooms-in at the low frequencies of the spectra for the conventional (black) and broadband (red) sweeps. Both sweeps have a duration of 10 s. The force limitation at the low frequencies is accounted for in this plot.
Figure 3:
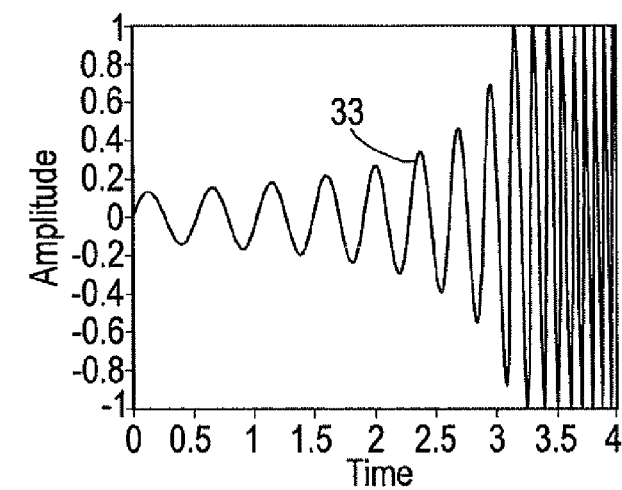
FIG. 3 is a time-domain representation of the first 4 s of the broadband sweep. For the frequencies up to the displacement limit of 5 Hz (corresponding to sweep times from 0 to 3.1 s), it can be observed that the low-frequency amplitudes are reduced due to the finite piston stroke.

An example of the low-frequency sweep is presented in FIGS. 1-3.

In FIG. 1 a comparison is made between the low-frequency sweep in accordance with the invention, which is shown as a grey line 1 and a standard linear sweep, which is shown as a black line 2.

The linear sweep is a 5-80 Hz, 10 s sweep. This conventional sweep is compared to a low frequency sweep with a nonlinear part from 1.8 to 5 Hz, and a linear part from 5 to 80 Hz. Following the calculation outlined above, the nonlinear sweep length was around 3.1 s and the linear sweep length around 6.9 s. Note that, although theoretically a value for n of −4 should be selected, a value of −3.5 gave better results and was used in the synthetic sweep generation. The vibrator displacement limit was assumed to be 5 Hz.

FIG. 2 is a plot which zooms-in at the low frequencies of the spectra for a conventional sweep, which is shown as a black line 22 and a broadband sweep according to the invention, which is shown as a grey line 21. Both sweeps have a duration of 10 s. The force limitation at the low frequencies is accounted for in this plot.

FIG. 3 is a time-domain representation of the first 4 s of the broadband sweep 33. For the frequencies up to the displacement limit of 5 Hz (corresponding to sweep times from 0 to 3.1 s), it can be observed that the low-frequency amplitudes are reduced due to the finite piston stroke.

FIGS. 1-3 show the spectra of the conventional and low-frequency sweep, with a uniform 0 dB level for all curves. Also, the time domain plot of the broadband sweep is shown, illustrating the amplitude reduction at the low frequencies (due to the finite piston stroke).

What is claimed is:

1. A method for performing seismic surveys, comprising: using a seismic vibrator that generates a sweep signal with enhanced low frequency content by generating a combination of a linear and nonlinear sweep, and wherein the nonlinear sweep $S_{nonl}(t)$ as a function of time (t) is calculated by a predetermined algorithm, wherein the predetermined algorithm comprises the formula:

$$s_{nonl}(t) = a_{max} \frac{\left[(f_{disp}^{n+1} - f_0^{n+1})\frac{t}{T_{nonl}} + f_0^{n+1}\right]^{\frac{2}{n+1}}}{f_{disp}^2} \times$$

$$\sin\left(2\pi \frac{T_{nonl}\left((f_{disp}^{n+1} - f_0^{n+1})\frac{t}{T_{nonl}} + f_0^{n+1}\right)^{\frac{1}{n+1}+1}}{(f_{disp}^{n+1} - f_0^{n+1})\left(\frac{1}{n+1} + 1\right)}\right) 0 \le t \le T_{nonl},$$

wherein:
($n \ne -2$, $n \ne -1$),
$f_{disp} > f_0$,
$f_0$ is on the order of 1-3 Hz
$f_{disp}$ is a displacement frequency that is greater than $f_0$,
$a_{max}$ is the maximum amplitude of the vibrator,
f is frequency,
$T_{nonl}$ is the duration of the nonlinear part of the sweep, and the exponent n is between −4 to 4.

2. The method of claim 1 wherein the nonlinear sweep has a duration $T_{nonl}$ and frequency limits from $f_0$ to $f_{disp}$ and the linear sweep has a duration $T_{lin}$ and frequency limits from $f_{disp}$ to $f_{max}$.

3. The method of claim 2, wherein the sweep has a duration $T = T_{lin} + T_{nonl}$.

4. The method of claim 3, wherein the sweep duration T is between 8 and 12 seconds, the nonlinear sweep duration $T_{nonl}$ is between 2 and 4 seconds and the linear sweep duration is between 6 and 8 seconds.

5. The method of claim 2 wherein the ratio between the duration of the linear sweep $T_{lin}$ and the non linear sweep $T_{nonl}$ is calculated by the formula:

$$\frac{T_{lin}}{T_{nonl}} = \frac{(n+1)(f_{max} - f_{disp})}{f_{disp}^4 [f_0^{n+1} - f_{disp}^{n+1}]} \times f^{n+4}$$

wherein n is a suitably chosen constant having a value between −2 and −6.

6. A system for performing seismic surveys, comprising:
a seismic vibrator that is configured to generate a sweep signal with enhanced low frequency content to generate a combination of a linear and nonlinear sweep and seismic data interpretation means comprising a predetermined algorithm for calculating the nonlinear sweep $S_{nonl}(t)$ as a function of time (t);
wherein the seismic vibrator is configured to generate a nonlinear sweep with a duration $T_{nonl}$ and frequency limits from $f_o$ to $f_{disp}$ and a linear sweep with a duration $T_{lin}$ and frequency limits from $f_{disp}$ to $f_{max}$;
wherein the seismic vibrator is configured to generate a sweep with a duration $T = T_{lin} + T_{nonl}$; and
wherein seismic vibrator is configured to generate a sweep duration T between 8 and 12 seconds, a nonlinear sweep duration $T_{nonl}$ between 2 and 4 seconds and a linear sweep duration between 6 and 8 seconds; and
wherein the seismic vibrator is configured to generate a seismic signal of which the ratio between the duration of the linear sweep $T_{lin}$ and the non linear sweep $T_{nonl}$ is calculated by the formula:

$$\frac{T_{lin}}{T_{nonl}} = \frac{(n+1)(f_{max} - f_{disp})}{f_{disp}^4 [f_0^{n+1} - f_{disp}^{n+1}]} \times f^{n+4}$$

wherein n is a suitably chosen constant having a value between −2 and −6 and wherein $f_0$ is on the order of 1-3 Hz, $f_{disp}$ is a displacement frequency that is greater than $f_0$.

7. A system for performing seismic surveys, comprising:
a seismic vibrator that is configured to generate a sweep signal with enhanced low frequency content to generate a combination of a linear and nonlinear sweep and seismic data interpretation means comprising a predetermined algorithm for calculating the nonlinear sweep $s_{nonl}(t)$ as a function of time (t);
wherein the seismic generator is configured to generate a nonlinear sweep with a duration $T_{nonl}$ and frequency limits from $f_0$ to $f_{disp}$ and a linear sweep with a duration $T_{lin}$ and frequency limits from $f_{disp}$ to $f_{max}$;
wherein the seismic generator is configured to generate a sweep with a duration $T = T_{lin} + T_{nonl}$; and
wherein seismic generator is configured to generate a sweep duration T between 8 and 12 seconds, a nonlinear sweep duration $T_{nonl}$ between 2 and 4 seconds and a linear sweep duration between 6 and 8 seconds; and
wherein the predetermined algorithm comprises the formula:

$$s_{nonl}(t) = a_{max} \frac{\left[(f_{disp}^{n+1} - f_0^{n+1})\frac{t}{T_{nonl}} + f_0^{n+1}\right]^{\frac{2}{n+1}}}{f_{disp}^2} \times \sin\left(2\pi \frac{T_{nonl}\left((f_{disp}^{n+1} - f_0^{n+1})\frac{1}{T_{nonl}} + f_0^{n+1}\right)^{\frac{1}{n+1}+1}}{(f_{disp}^{n+1} - f_0^{n+1})\left(\frac{1}{n+1} + 1\right)}\right) 0 \leq t \leq T_{nonl},$$

wherein:
($n \neq -2, n \neq -1$)
$f_{disp} > f_0$,
$f_0$ is on the order of 1-3 Hz
$f_{disp}$ is a displacement frequency that is greater than $f_0$,
$a_{max}$ is the maximum amplitude of the vibrator,
f is frequency,
$T_{nonl}$ is the duration of the nonlinear part of the sweep, and
the exponent n is between −4 to 4.

* * * * *